United States Patent
Yatsuda et al.

(10) Patent No.: US 6,781,430 B2
(45) Date of Patent: Aug. 24, 2004

(54) CLOCK SIGNAL SUPPLY CIRCUIT WITH ODD HARMONIC LEAKAGE PREVENTION FEATURE

(75) Inventors: Senichiro Yatsuda, Fukushima-ken (JP); Yasuhiro Ikarashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/313,262

(22) Filed: Dec. 6, 2002

(65) Prior Publication Data

US 2003/0117203 A1 Jun. 26, 2003

(30) Foreign Application Priority Data

Dec. 14, 2001 (JP) ........................................ 2001-381208

(51) Int. Cl.[7] ................................................ G06F 1/04
(52) U.S. Cl. ...................................... 327/291; 327/295
(58) Field of Search ................................ 327/291, 299, 327/295, 105, 106, 129

(56) References Cited

U.S. PATENT DOCUMENTS 6,076,171 A * 6/2000 Kawata ...................... 713/501

FOREIGN PATENT DOCUMENTS

| JP | 54131973 A | * | 10/1979 | ............. G01P/3/44 |
| JP | 57069258 A | * | 4/1982 | ........... G01R/17/10 |
| JP | 59169222 A | * | 9/1984 | ............ H03K/3/78 |
| JP | 7-86878 | | 3/1995 | |

* cited by examiner

Primary Examiner—Timothy P. Callahan
Assistant Examiner—Cassandra Cox
(74) Attorney, Agent, or Firm—Brinks Hofer Gilson & Lione

(57) ABSTRACT

A clock signal supply circuit includes a sine wave oscillator and a circuit operating with an oscillation signal, as a clock signal, outputted from the sine wave oscillator, a waveform shaping circuit is provided correspondingly to the circuit, the circuit and the waveform shaping circuit are constructed in the same circuit unit, and the oscillation signal is converted into a rectangular wave by the waveform shaping circuit in the circuit unit and is supplied to the circuit.

17 Claims, 3 Drawing Sheets

CLOCK SIGNAL SUPPLY CIRCUIT WITH ODD HARMONIC LEAKAGE PREVENTION FEATURE

BACKGROUND OF THE INVENTION

1. Field of the Invention

The present invention relates to a supply circuit of a clock signal in, for example, a computer.

2. Description of the Related Art

FIG. 4 shows a conventional clock signal supply circuit 1. A clock signal outputted from a clock signal generator 35 is supplied to circuit units provided in the inside of a personal computer (called pasokon), such as a CPU 31, a memory 32, a video card 33, and a sound card 34. The clock signal generator 35 outputs a rectangular wave, and is mounted on a mother board 36 in the personal computer as shown in FIG. 5.

The CPU 31 or the memory 32 is constructed as an integrated circuit, and is mounted on the mother board 36. Besides, the video card 33 or the sound card 34 is made of a dedicated card-type board on which an image processing circuit or a sound processing circuit is constructed. Connectors 37 are attached on the mother board 36, and these cards are mounted to the mother board 36 through the connectors 37.

A wiring conductor (not shown), which becomes a bus, is formed on the mother board 36, and the clock signal is supplied to the respective circuit devices through this wiring conductor.

In the conventional structure, the clock signal is transmitted on the mother board and is inputted to the respective circuit devices. The rectangular wave includes many higher harmonics as is generally known, and as shown in FIG. 6, the levels of odd harmonics are especially high. Thus, they easily leak out of the personal computer, and there has been a problem that they interfere with other electronic equipment.

SUMMARY OF THE INVENTION

The invention has an object to realize a circuit for preventing odd harmonics of a clock signal from leaking out of an equipment, such as a personal computer, using the clock signal.

To the above problem, a circuit of the invention includes a sine wave oscillator and a circuit operating with an oscillation signal, as a clock signal, outputted from the sine wave oscillator, and is characterized in that a waveform shaping circuit is provided correspondingly to the circuit, the circuit and the waveform shaping circuit are constructed in a same circuit unit, and the oscillation signal is converted into a rectangular wave by the waveform shaping circuit in the circuit unit and is supplied to the circuit.

Besides, a feature is that the circuit unit is an integrated circuit constituting a circuit such as a CPU or a memory.

Besides, a feature is that the circuit unit is a dedicated card-type board constituting a circuit such as a sound processing circuit or an image processing circuit.

Besides, a feature is that the sine wave oscillator is constituted by a PLL synthesizer.

DETAILED DESCRIPTION OF THE PREFERRED EMBODIMENTS

Figure 1:
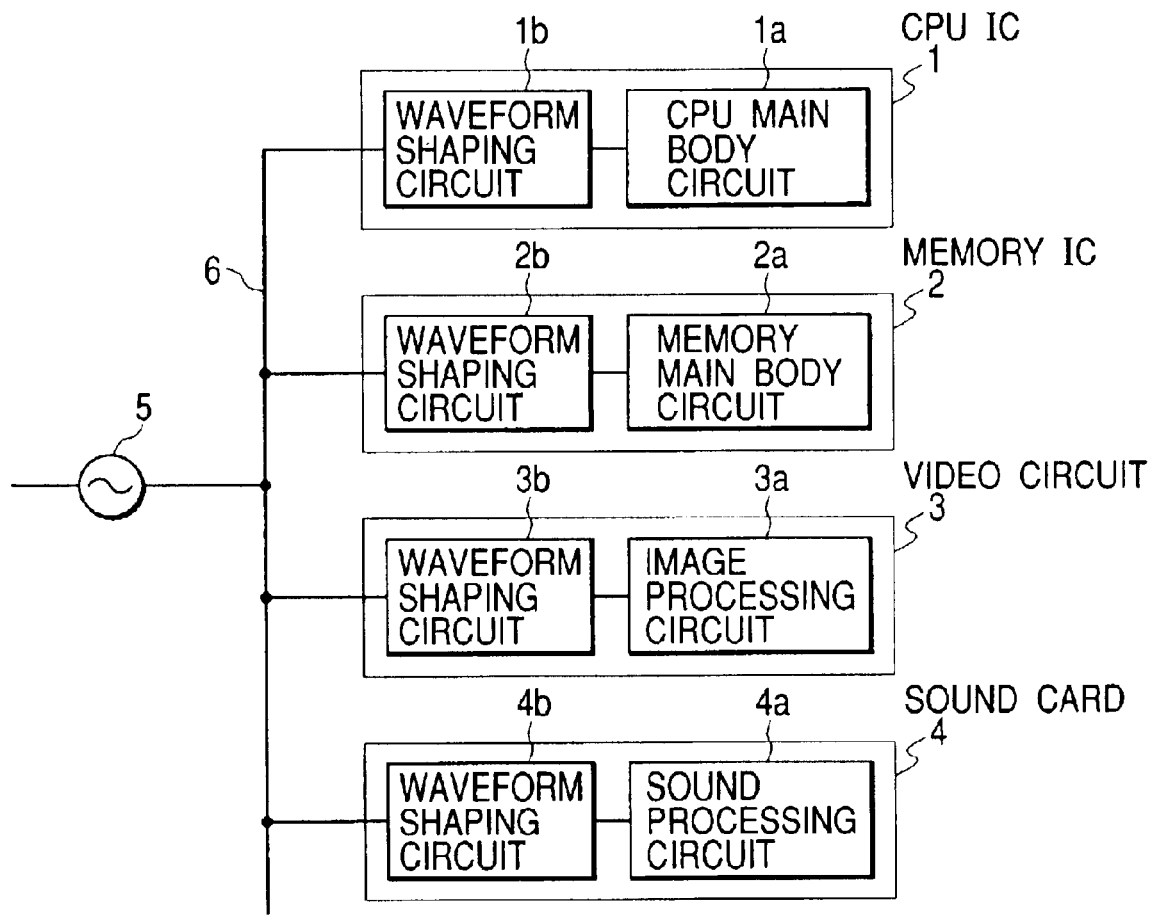
FIG. 1 is a block diagram showing a structure of a clock signal supply circuit of the invention.

FIG. 1 shows a clock signal supply circuit of the invention. Circuit units, such as a CPU IC (integrated circuit constituting a CPU) 1, a memory IC (integrated circuit constituting a memory) 2, a video card 3, and a sound card 4, and a clock oscillator (sine wave oscillator) 5 are provided in the inside of a personal computer (called pasokon) or the like.

A waveform shaping circuit 1b is constructed in the inside of the CPU IC 1, in addition to a main body circuit 1a of the CPU comprised of a control unit and an arithmetic unit. A waveform shaping circuit 2b is constructed in the inside of the memory IC 2, in addition to a main body circuit 2a of the storage device. Besides, the video card 3 includes an image processing circuit 3a and a waveform shaping circuit 3b constructed on a dedicated card-type board, and similarly, the sound card 4 includes a sound processing circuit 4a and a waveform shaping circuit 4b constructed on a dedicated card-type board.

Besides, the clock oscillator 5 is constituted by a PLL-controlled frequency synthesizer or the like, and outputs an oscillation signal of a sine wave. Then, the oscillation signal is supplied to the respective circuit units, such as the CPU IC 1, the memory IC 2, the video card 3, and the sound card 4, through a bus 6.

Figure 2:
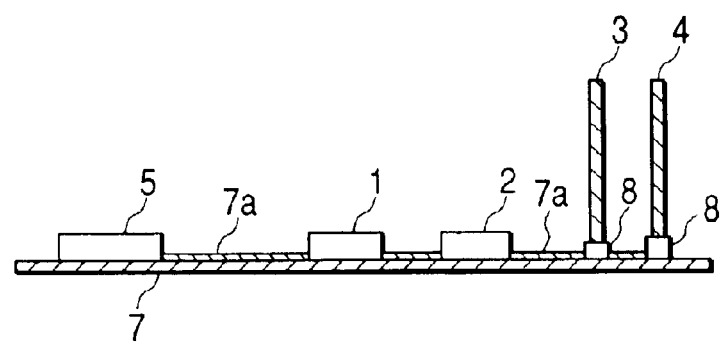
FIG. 2 is a structural view of the inside of a personal computer for explaining the clock signal supply circuit of the invention.

Among the respective circuit units 1 to 4, the CPU IC 1, the memory IC 2, and the clock oscillator 5 are mounted on a mother board 7 in the personal computer as shown in FIG. 2. Besides, a connector 8 is attached on the mother board 7, and the video card 3 or the sound card 4 is mounted to the mother board 7 through the connector 8.

A wiring conductor 7a, which becomes the bus 6, is formed on the mother board 7, and the oscillation signal outputted from the clock oscillator 5 is transmitted through this wiring conductor 7a and is supplied to the respective circuit units 1, 2, 3 and 4.

The oscillation signal supplied to each of the circuit units 1, 2, 3 and 4 is first converted into a rectangular wave by each of the waveform shaping circuits 1b, 2b, 3b and 4b, and is supplied to each of the main body circuit 1a of the CPU, the memory main body circuit 2a, the video processing circuit 3a, and the sound processing circuit 4a, in the same circuit unit.

Figure 3:
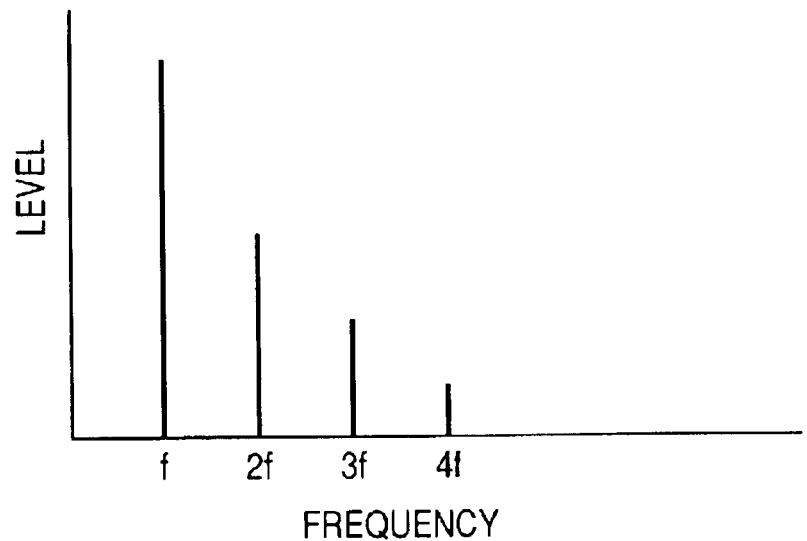
FIG. 3 is a view showing radiation levels of higher harmonics in the clock signal supply circuit of the invention.
Figure 4:
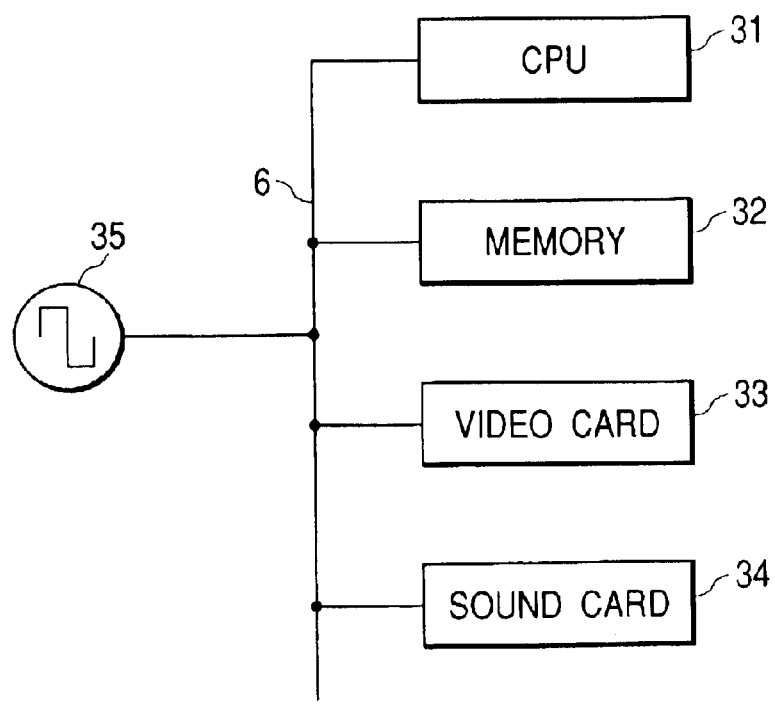
FIG. 4 is a block diagram showing a structure of a conventional clock signal supply circuit.
Figure 5:
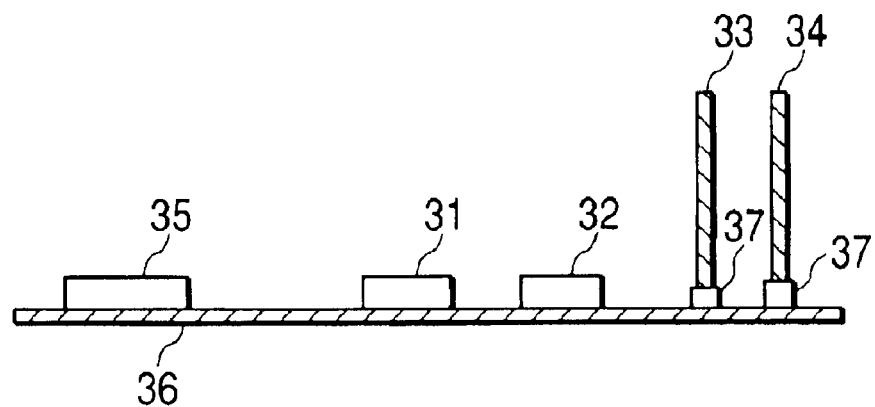
FIG. 5 is a structural view in the inside of a personal computer for explaining the conventional clock signal supply circuit.
Figure 6:
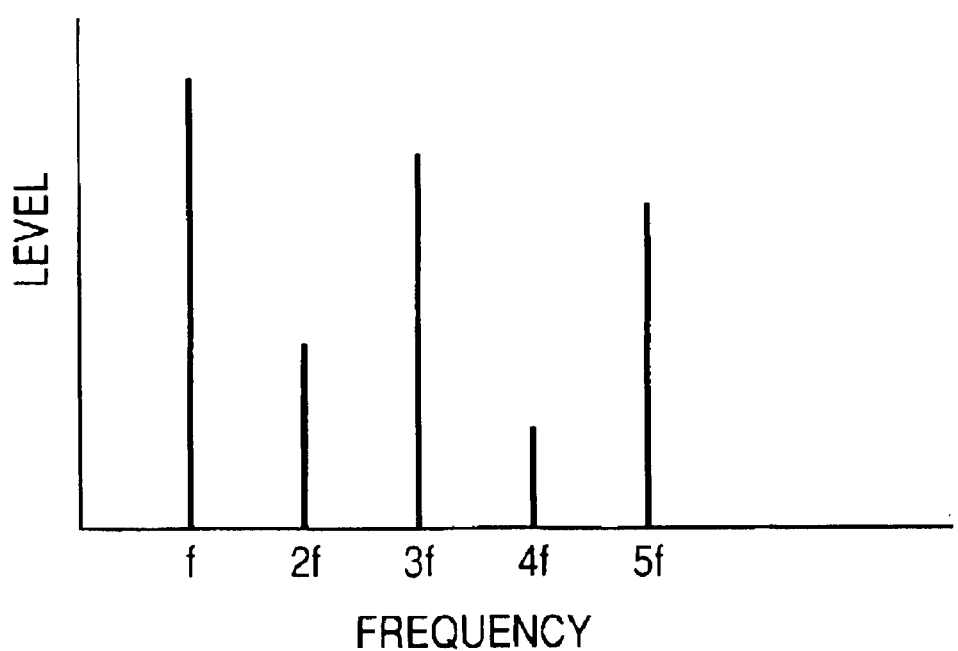
FIG. 6 is a view showing radiation levels of higher harmonics in the conventional clock signal supply circuit.

Therefore, since the oscillation signal (fundamental frequency f) of the sine wave is transmitted on the mother board 7, the levels of higher harmonics radiated from the wiring conductor 7a, especially those of odd harmonics become low as shown in FIG. 3, and they do not interfere with other circuits in the personal computer, and further, higher harmonics leaking out of the personal computer also lessen.

As described above, the clock signal supply circuit of the invention includes a sine wave oscillator and a circuit operating with an oscillation signal, as a clock signal, outputted from the sine wave oscillator, a waveform shaping circuit is provided correspondingly to the circuit, the circuit and the waveform shaping circuit are constructed in a same circuit unit, and the oscillation signal is converted into a rectangular wave by the waveform shaping circuit in the circuit unit, whereby the oscillation signal having low level higher harmonics is transmitted from the sine wave oscillator to the circuit unit. Accordingly, higher harmonics radiated therebetween also lessen. Besides, since the oscillation signal transmitted to the circuit unit is converted into the rectangular wave in the circuit unit and is immediately supplied to the circuit, higher harmonics radiated to the outside of the circuit unit also lessen. Accordingly, they do not interfere with other circuits in the equipment, and further, higher harmonics radiated to the outside of the equipment also lessen.

Besides, since the circuit unit is an integrated circuit constituting a circuit such as a CPU or a memory, the oscillation signal is changed into the rectangular wave in the integrated circuit and is supplied to the circuit, and accordingly, higher harmonics radiated to the outside of the integrated circuit also lessen.

Besides, since the circuit unit is a dedicated card-type board constituting a circuit such as a sound processing circuit or an image processing circuit, it is changed into the rectangular wave in the card-type board and is supplied to the circuit, and accordingly, higher harmonics radiated to the outside of the card-type board also lessen.

Besides, since the sine wave oscillator is constituted by a PLL synthesizer, selection of a frequency of the clock signal can be suitably made correspondingly to each circuit.

What is claimed is:

1. A clock signal supply circuit, comprising:
   a sine wave oscillator; and
   a plurality of circuits, each operating with an oscillation signal, as a clock signal, outputted from the sine wave oscillator, wherein
      a waveform shaping circuit is provided for each of the plurality of circuits,
      each of the plurality of circuits and the waveform shaping circuit provided for the corresponding circuit are constructed in a circuit unit, and the oscillation signal is converted into a rectangular wave by the waveform shaping circuit in the circuit unit and is supplied to the circuit.

2. A clock signal supply circuit as set forth in claim 1, wherein the circuit unit is an integrated circuit.

3. A clock signal supply circuit as set forth in claim 1, wherein the circuit unit is a dedicated card-type board.

4. A clock signal supply circuit as set forth in claim 1, wherein the sine wave oscillator contains a PLL synthesizer.

5. A clock signal supply circuit as set forth in claim 2, wherein the integrated circuit is one of a CPU and a memory.

6. A clock signal supply circuit as set forth in claim 3, wherein the dedicated card-type board is one of a sound processing circuit and an image processing circuit.

7. A clock signal supply circuit comprising:
   a sine wave oscillator, the sine wave oscillator containing a PLL synthesizer; and
   a circuit operating with an oscillation signal, as a clock signal, outputted from the sine wave oscillator, wherein
      a waveform shaping circuit is provided correspondingly to the circuit, the circuit and the waveform shaping circuit are constructed in a same circuit unit, and the oscillation signal is converted into a rectangular wave by the waveform shaping circuit in the circuit unit and is supplied to the circuit.

8. A clock signal supply circuit as set forth in claim 7, wherein the circuit unit is a dedicated card-type board.

9. A clock signal supply circuit as set forth in claim 8, wherein the dedicated card-type board is one of a sound processing circuit and an image processing circuit.

10. A clock signal supply circuit as set forth in claim 7, wherein the circuit unit is an integrated circuit.

11. A clock signal supply circuit as set forth in claim 10, wherein the integrated circuit is one of a CPU and a memory.

12. A clock signal supply circuit comprising:
    a sine wave oscillator providing an oscillation signal; and
    a plurality of circuit units, each circuit unit receiving the oscillation signal as a clock signal from the sine wave oscillator, the circuit unit containing a waveform shaping circuit that converts the oscillation signal into a rectangular wave.

13. A clock signal supply circuit as set forth in claim 12 wherein the circuit unit is a dedicated card-type board.

14. A clock signal supply circuit as set forth in claim 13, wherein the dedicated card-type board is one of a sound processing circuit and an image processing circuit.

15. A clock signal supply circuit as set forth in claim 12, wherein the circuit unit is an integrated circuit.

16. A clock signal supply circuit as set forth in claim 15, wherein the integrated circuit is one of a CPU and a memory.

17. A clock signal supply circuit as set forth in claim 12, wherein the sine wave oscillator further comprises a PLL synthesizer.

* * * * *